United States Patent
Gooch et al.

(10) Patent No.: US 8,405,550 B2
(45) Date of Patent: Mar. 26, 2013

(54) NEAR-VERTICAL DIRECTION FINDING AND GEOLOCATION SYSTEM

(75) Inventors: Richard P. Gooch, Palo Alto, CA (US); Alan W. Roscow, San Jose, CA (US)

(73) Assignee: Raytheon Applied Signal Technology, Inc., Sunnyvale, CA (US)

( * ) Notice: Subject to any disclaimer, the term of this patent is extended or adjusted under 35 U.S.C. 154(b) by 164 days.

(21) Appl. No.: 13/046,685

(22) Filed: Mar. 11, 2011

(65) Prior Publication Data

US 2012/0026042 A1 Feb. 2, 2012

Related U.S. Application Data

(60) Provisional application No. 61/369,651, filed on Jul. 30, 2010.

(51) Int. Cl.
*G01S 5/02* (2010.01)
*G01S 5/04* (2006.01)

(52) U.S. Cl. .................................... 342/417; 342/444

(58) Field of Classification Search .............. 342/417, 342/442–445
See application file for complete search history.

(56) References Cited

U.S. PATENT DOCUMENTS

| 6,259,404 | B1 * | 7/2001 | Parl et al. ........................ 342/457 |
| 2001/0003443 | A1 | 6/2001 | Velazquez et al. |
| 2003/0222778 | A1 * | 12/2003 | Piesinger ........................ 340/541 |
| 2005/0046584 | A1 | 3/2005 | Breed |
| 2006/0087475 | A1 | 4/2006 | Struckman |
| 2010/0321242 | A1 | 12/2010 | Robinson et al. |

OTHER PUBLICATIONS

Written Opinion of the International Searching Authority for International Application No. PCT/US11/46029, filed Jul. 29, 2011, Written Opinion dated Nov. 21, 2011 and mailed Dec. 8, 2011 (3 pgs.).
International Search Report for International Application No. PCT/US11/46029, filed Jul. 29, 2011, International Search Report dated Nov. 21, 2011 and mailed Dec. 8, 2011 (4 pgs.).

* cited by examiner

*Primary Examiner* — Dao Phan
(74) *Attorney, Agent, or Firm* — Christie, Parker & Hale, LLP (57) ABSTRACT

A system and method for geolocating an RF emitter disposed on or near the ground includes receiving a signal from the RF emitter at each antenna of an array of N non-collinear antennas, wherein N is an integer greater than 2; routing the signal received at each of the antennas to one of a bank of N corresponding receivers; downconverting the N received signals to N downconverted signals; digitizing the N downconverted signals to digitized signals on N corresponding channels; using a processor to determine phase and amplitude variations across the N channels and to determine a Direction Vector corresponding to the signal received from the RF emitter; using a 2-dimensional pre-determined calibration table to look up a best match to the Direction Vector to determine a Bearing Vector to the RF emitter; transforming the Bearing Vector into locally level reference frame; and geolocating the RF emitter by determining an intersection between the locally level reference frame Bearing Vector and a dataset containing local terrain data.

18 Claims, 3 Drawing Sheets

Polarization Diagram

FIG. 3A

Spectral Diagram

NEAR-VERTICAL DIRECTION FINDING AND GEOLOCATION SYSTEM

RELATED APPLICATION(S)

This application claims the benefit of priority based on U.S. Provisional Patent Application Ser. No. 61/369,651 filed Jul. 30, 2010 bearing the title "Near Vertical Direction Finding" and filed in the name of the same inventors and commonly assigned herewith.

TECHNICAL FIELD

The present disclosure relates generally to radio direction finding and geolocation in which the location of a radio frequency (RF) emissive source (RF emitter) is to be geolocated.

BACKGROUND

It is often required to determine the location of an RF emitter for various purposes. For example, in an emergency situation such as a fire or earthquake, people in danger need to be located rapidly so that they may be rescued from the situation. Some such people may be equipped with emergency radio transponders operating on pre-established radio frequencies, others may be equipped with cellular telephones operating on commercial mobile telephone frequencies. In any event, it would be desirable to provide rapid geolocation of such radio emissive sources.

OVERVIEW

A system and method for geolocating an RF emitter disposed on or near the ground includes receiving a signal from the RF emitter at each antenna of an array of N non-collinear antennas, wherein N is an integer greater than 2; routing the signal received at each of the antennas to one of a bank of N corresponding receivers; downconverting the N received signals to N downconverted signals; digitizing the N downconverted signals to digitized signals on N corresponding channels; using a processor to determine phase and amplitude variations across the N channels and to determine a Direction Vector corresponding to the signal received from the RF emitter; using a 2-dimensional pre-determined calibration table to look up a best match to the Direction Vector to determine a Bearing Vector to the RF emitter; transforming the Bearing Vector into locally level reference frame; and geolocating the RF emitter by determining an intersection between the locally level reference frame Bearing Vector and a dataset containing local terrain data.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

In the drawings.

DESCRIPTION OF EXAMPLE EMBODIMENTS

Example embodiments are described herein in the context of a system of electronics, computers and software/firmware performing airborne radio direction finding and geolocation. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

The system described herein is configured to determine the direction to RF emitters on the ground as seen by an airborne platform, and includes a means to then determine the geolocation coordinates (e.g., latitude and longitude) of the RF emitter. An example of a use for such a system would be as an aid to first responders in locating persons (possessing RF emitters such as portable cellular telephones) needing help after a disaster. While many DF (direction finding) and geolocation airborne systems have been built in the past, the Near Vertical Direction Finding (NVDF) system described herein differs at least in that it uses a two-dimensional antenna array and is therefore able to geolocate signals based on a single DF measurement, a feature referred to herein as "instantaneous geolocation". This is in contrast to conventional DF systems that are one-dimensional in nature and require a series of lines-of-bearing (LOBs) taken at several different places along the flight path of the airborne platform in order to determine the geolocation by the intersection of those LOBs. Such conventional DF systems typically calculate a single DF angular measurement (azimuth), although they often calibrate at a few different elevation angles to obtain better accuracy for RF emitters that are closer to the airborne platform. Such systems still require multiple LOBs to obtain a geolocation, and they are designed primarily for "stand-off" operation where the RF emitter being geolocated is off to one side of the airborne platform. The NVDF system described herein estimates two angles simultaneously from a two-dimensional antenna array, and it is capable of achieving high geolocation accuracy for RF emitters that are off to the side, directly below, or nearly directly below the airborne platform (hence the use of the term "near-vertical" in the name).

In accordance with one embodiment of the NVDF system, the antenna array is mounted on a flat plate which is, in turn, mounted on the airborne platform so that it can have a clear view straight down to the ground (i.e., in the nadir direction) and out to the sides in all directions with an angular coverage that depends on the angular field-of-view (FOV) of the antennas that comprise the array. The NVDF antenna array can also be mounted at a tilt so that it looks out more to one side of the airborne platform to optimize the coverage for cases where the airborne platform flies in a circle around an area of interest. For a typical antenna with a ±60 degree angular FOV, mounting the antenna array at a tilt of 30 degrees from the level position would allow the system to work from points directly below the airborne platform all the way out to the horizon. The NVDF system can be designed with any number of antennas from a minimum of 3 up to a maximum that is determined by practical considerations of size, weight, potential aerodynamic considerations and power consumption of the system. An example NVDF system may have on the order of eight antennas, which has been found to strike a good balance between accuracy and the size, weight, and power of the system.

The NVDF obtains a two-dimensional angular measurement to the RF emitter on ground, which points to the direction of the RF emitter from the airborne platform. A navigation system is used as part of the system to determine the location of the airborne platform (e.g., latitude, longitude, and altitude) as well as the orientation of the airborne platform (and hence the orientation of the antenna sensor array) (e.g., in terms of heading relative to true North, pitch, and roll). The heading, pitch, and roll data are used to mathematically transform the direction of the RF emitter relative to the airborne antenna array into a direction that is relative to a locally level plane and referenced to True North. This two-dimensional angular measurement (which is referred to herein as a "bearing vector" or "BV") can be thought of as a ray that points from the airborne platform down to the RF on the ground. This bearing vector is then intersected with a mathematical representation of the terrain elevation typically referred to as DTED (Digital Terrain Elevation Data) to obtain the location of the RF emitter in terms of latitude, longitude, and altitude. This data may then be displayed on a map, to allow an operator to see where the RF emitter is located. The latitude and longitude can also be sent to other on-board sensors (such as a camera) to provide additional information about the RF emitter, and it can also be sent to the ground using a conventional data link or communicated directly to the ground using a radio.

One example use for an NVDF system would be to locate survivors possessing radio transmitters such as portable cellular telephones in the event of a natural disaster or other calamity. It is possible to detect cellular telephone activity from cellular telephones at a distance, and given the fact that most people now regularly carry such telephones, that activity can be used to locate stranded or incapacitated individuals so emergency personnel can be sent to help. The NVDF system can be designed to work in various RF (radio frequency) bands by choosing different types of antennas, and this allows it to work with a variety of devices that emit RF energy. For example, in the 100 MHz to 500 MHz region, several types of hand-held radios are licensed that allow people to communicate each other. These types of radio transmitters do not depend on a network of base stations as cellular phones do, so they may be more useful during a disaster and the NVDF system could be used to detect and geolocate them.

An NVDF system can be installed on any type of airborne platform, such as a fixed wing aircraft, a helicopter, an unmanned aerial vehicle (UAV), or an aerostat. It is also possible to deploy an NVDF system on the ground, with the antenna array either mounted from a mast extending from a ground vehicle or mounted onto the top or side of a building or other ground structure. When utilized as a ground-based system, the NVDF system provides an elevation angle to an RF emitter in addition to the conventional azimuth angle that a ground-based DF system would provide. The simultaneous measurement of both elevation and azimuth angles allows for determining the location of an RF emitter on the ground.

The NVDF system incorporates the following properties: (1) it utilizes a two-dimensional antenna array to obtain a two-dimensional bearing vector that points to the direction of an RF emitter; (2) the measurements of the two angles in the bearing vector are made simultaneously based on a single short RF transmission from an RF emitter; (3) an "instantaneous" geolocation estimate of an RF emitter is obtained by intersecting the bearing vector with the terrain; (4) due to the instantaneous geolocation feature, the NVDF system is able to geolocate an RF emitter based on only one short transmission from the RF emitter; and (5) accurate geolocation estimates are obtained for RF emitters that are located directly below the airborne platform as well as for RF emitters that are located off to the side of the airborne platform.

Figure 1:
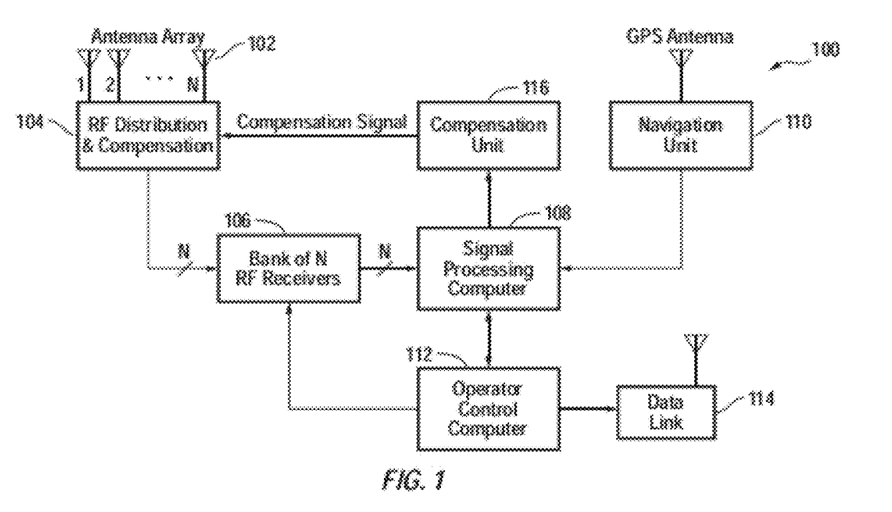
FIG. 1 is a schematic block diagram showing the major components of a near vertical direction finding system in accordance with one embodiment of the present invention.

Turning now to the Figures, in FIG. 1, a schematic block diagram 100 shows the major components of an NVDF system in accordance with one embodiment of the present invention. An antenna array 102 of N (N is an integer more than 2) antennas is coupled to a corresponding bank of N RF receivers 106 which is, in turn, coupled to a signal processing computer 108. A navigation unit with an integrated GPS receiver 110 is provided to determine the location of the airborne platform at any given time and, optionally, to provide an accurate time base. Operator control electronics such as a computer 112 are provided for control of the signal processing computer 108 and the receivers 106 as well as for display and output purposes. Optional data link 114 may be provided to transfer data to other computer systems (e.g., on the ground). A compensation unit 116 may be provided as described below.

Figure 2:
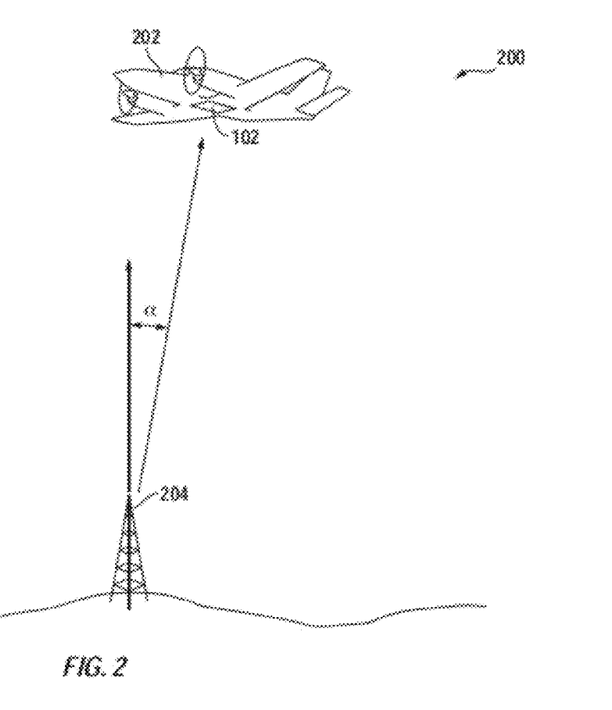
FIG. 2 is a diagram illustrating a near vertical direction finding search.

An antenna array 102 of N elements mounted to the airborne platform (e.g., 202 in FIG. 2) is used to sense the signals from RF emitters (e.g., 204 in FIG. 2) and to provide amplitude and phase measurements for determining their direction of arrival. In order to obtain two angular measurements for the bearing vector, the (N>2) antennas must be arranged in a two-dimensional pattern (i.e., they cannot all be collinear). The minimum number of antenna elements that can be arranged in a two-dimensional pattern is three, although for practical reasons more than three are usually used (eight has been found to work well). The antennas can be mounted on a flat plate that is then mounted to bottom or side of the airborne platform. The array can be mounted so that it points straight down, or it can be mounted on a tilt to look off to one side. The antennas can also be mounted directly onto the skin of the airborne platform, and it is not necessary that they all be mounted in the same geometrical plane.

The antennas utilized in the array will have some angular beam width, which usually can be described as a cone centered on the boresight of the antenna. A typical antenna might have an angular FOV of 60 degrees from the boresight, which describes a cone with a total angle of 120 degrees. If such an antenna is pointed straight down towards the Earth, it will be able to receive signals from directly below the airborne platform and out to an angle of 60 degrees in all directions. If a set of N such antennas are mounted on a flat plate, they will all be pointed in the same direction and the entire array will have the FOV that was just described for an individual antenna. The angular cone of the FOV will intersect with the Earth in a circle if the terrain below the airborne platform is flat, and this describes the geographical FOV for the NVDF system. Such an array is capable of receiving signals from anywhere in the FOV, obtaining two-dimensional direction of arrival (bearing vector), and obtaining a geolocation by intersecting the bearing vector with the terrain. It is also possible to mount the antenna array to a positioned device which can adjust tilt during flight, if desired.

If the airborne platform turns such that it rolls along the fuselage axis, or if it pitches either nose up or nose down, the array plate will no longer be level and point straight down towards nadir. In this case, the angular FOV of the antennas will intersect the Earth in an ellipse (assuming flat terrain) that will extend either to the left or right side or fore or aft depending on the roll and pitch. This changes the geographical FOV, which may be used to advantage when searching for RF emitters that may be located further away from the airborne platform.

The array plate may also be mounted on a tilt relative to a level plane, which produces the same effect of changing the FOV. For example, many situations may involve circling an area of interest to maintain a persistent ability to monitor that area. If the airborne platform is flying in a circle turning to the left, then the array can be mounted below the airborne platform on a tilt so that it aims more to the left. This will maximize the area of persistence if the tilt is chosen correctly with respect to the amount of roll experienced during the circular flight. Another reason for mounting the array on a tilt would be to extend the FOV out to the horizon on one side, at the expense of somewhat lessening the coverage on the opposite side. This allows the system to direction find and geolocate RF emitters over a very wide area while flying in a straight line.

Many types of antennas may be used in the array, but commonly used antennas are cavity-back spiral antennas, helical antennas, or patch antennas. It is also possible to use monopole antennas or dipole antennas, as long as their beam pattern is consistent with the desired FOV. Cavity-back spirals and helical antennas are good choices for an NVDF system because they are inherently circularly polarized. It is also possible to construct a patch or other type antenna with circular polarization by utilizing a 90 degree hybrid combiner. Circular polarization is advantageous because most of the ground-based RF emitters will transmit with linear polarization, and a circularly polarized antenna is able to receive any linear polarized signal equally well. Since many of the ground-based RF emitters are expected to be hand-held, the polarization of the transmissions that they emit may be any arbitrary polarization angle. Also, when looking straight down (or nearly straight down) on such an RF emitter from an airborne NVDF platform, the polarization angle would not be well defined and would be subject to change as the airborne platform moves and changes angular orientation due to pitch and roll. A circularly polarized receive antenna is able to obtain sufficient gain on such signals, regardless of their polarization.

The types of antennas used for circular polarization are more complex than simple monopole or dipole antennas. Although they are able to receive signals from any arbitrary polarization, they do produce different phase and amplitude responses as a function of the polarization angle on the received signal. This causes a change in phases and amplitudes of the N antennas in the array (the array response), which must be taken into account to achieve a high accuracy in the DF (direction finding) measurement. The technique used to account for the changing response as a function of polarization is discussed below in conjunction with the calibration approach and the method for performing a calibration search.

Compensation Unit 106 is simply a signal generator that can be commanded to generate any frequency on which a DF measurement is being made. The signal generator is tuned to a frequency that is within the receiver bandwidth but is preferably positioned off to the upper or lower edge so it can be easily filtered out separately from the signal being processed. Using a compensation signal is a standard technique for any DF system and its purpose is to provide a reference signal so that phase changes in the cables or receivers can be measured and taken out of the phase measurements that are made on the signal. This allows the system to stay in calibration for a long period of time after it has been calibrated, since any phase changes in the signal path due to ageing or temperature can be cancelled out using the measurements made on the compensation signal.

RF Distribution and Compensation unit 104 comprises RF components to allow the compensation signal to be injected into the signal path very close to the antenna. It is desirable to inject the compensation signal as close to the antenna as possible, so that only the antenna itself and a short cable are outside of the compensation loop. An RF coupler can be used to inject the compensation signal alongside the signal being processed. This allows compensation to be performed simultaneously with the DF measurement being made on the signal of interest. This compensation is necessary if the receivers are all phase locked but do not run on a common set of local oscillators, so that they each have individual phase noise. The compensation signal in this case has the same variation in phase noise across the N channels because it is measured during the same time period as the signal of interest. If the receivers do run on a common set of local oscillators, then it is possible to perform the compensation at one time and use that information at a later time. In this case, the phase noise is common across all of the input channels and therefore it does affect the relative phases across the channels. In this case, it is possible to use an RF switch to select only the compensation signal as the input, which isolates signals being received on the antennas from the compensation measurement.

An NVDF system with N antennas requires a bank of N receivers 106 to capture the signal from each antenna. The receivers tune to the frequency of the signal of interest and are set to a bandwidth commensurate with the bandwidth of the signal of interest. The receivers provide gain to process weak RF signals, and down-convert the signal of interest to baseband (0 Hz) or to a frequency near baseband where it can be efficiently digitized by an analog-to-digital converter (ADC). The receivers need to convert the signal without putting random phase shifts on the different channels, which is why a common set of local oscillators are often used for tuning and down-converting the signal in each of the N receivers. The compensation signal is used to take out slow variations in the phase of the receivers due to ageing or temperature changes. It is also possible to use individual local oscillators for each receiver, as long as they are all phase-locked to a common frequency reference. In this case, there will be uncorrelated phase noise across the N channels and the compensation signal must be measured during the same time period that the signal of interest is being processed. For these types of receivers, the RF coupler method of injecting the compensation signal is used, as discussed above.

The digitized signals from the N channels are fed to a signal processing computer 108 where they are processed. This processor 108 computes the phase and amplitude variations across the N channels for both the signal of interest and the compensation signal. The actual method used to extract the amplitude and phase response of the signals is described below.

The navigation unit 110 is a standard component of any airborne DF system. The purpose of the navigation unit 101 is to provide information on exactly where the airborne platform was when the DF measurement was made, and to provide the angular orientation of the airborne platform (and hence the antenna array) in terms of heading, pitch, and roll. This information is necessary so that a bearing vector can be determined at the correct location of the airborne platform and so that it can be orientated relative to True North in a locally level plane. The bearing vector at this position and orientation can then be intersected with the Earth to obtain the geolocation. Such navigation units commonly use a GPS receiver to obtain latitude, longitude, and altitude information.

The operator control computer 112 provides overall control of the system, including where the receivers are tuned in frequency, and how long it dwells for taking DF measurements. The control computer can also provide the user interface to allow an operator to start, stop, and control the system. The control computer can also host a mapping application that puts the computed geolocations on a map so the operator can visualize the results, or these results can be sent on to another computer that is either local or remote from the airborne platform.

As was mentioned previously, the antennas that are well-suited to use in an NVDF system often have a phase and amplitude response that changes as a function of the polarization of the incoming signal. In order to account for this, the response of the antenna array must be measured over a variety of polarizations. The method to perform such a calibration involves using a "polarization-rich" calibration signal. The polarization-rich calibration signal provides a series of individual continuous-wave frequencies (i.e., a continuous carrier with no modulation) that will here be referred to as "tones". Five tones are typically used in one embodiment of the invention, although it may be possible use as few as three. Theoretically, only two polarizations spaced 90 degrees apart would be sufficient to probe the response of the antennas, but experience has shown that some antennas experience very low response at certain polarizations, which in some cases may be caused by mutual coupling between antennas or by complex interactions with metallic parts of the airborne platform. It may be possible to use as few as three polarization angles.

Figure 3A:
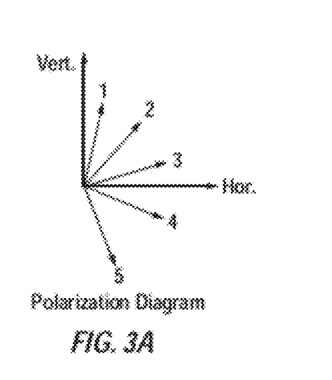
FIG. 3A is a polarization diagram depicting the polarization of tones in a calibration signal used to create a calibration table for a near vertical direction finding system in accordance with one embodiment of the present invention.
Figure 3B:
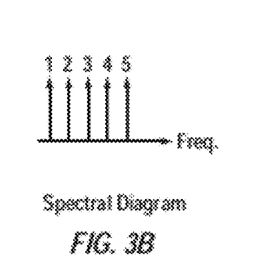
FIG. 3B is a spectral diagram depicting the frequency distribution of tones in a calibration signal used to create a calibration table for a near vertical direction finding system in accordance with one embodiment of the present invention.

The nature of the five tones (five will be used as an example here) is shown in FIGS. 3A and 3B. FIG. 3A is a polarization diagram which depicts the polarization of the tones, where the two axes can be thought of as X and Y perpendicular to the direction of propagation. The two axes are labeled as horizontal and vertical because that is the common designation of the two ports on a dual-polarized antenna. The tones are generated in two channels, with one channel going to the horizontal input and the other channel going to the vertical input. The polarization diagram illustrates that each tone is at a different polarization angle, and the five tones are spread equally to span the range from 0 to 180 degrees. A polarization that is D degrees greater than 180 degrees is the same as a polarization of D degrees because the electric field vector which defines the polarization is oscillating and constantly changing direction from the direction shown by the red arrows to a direction in the opposite direction. These five tones are closely spaced in frequency, as shown in FIG. 3B which is a spectral diagram. Typical spacing is preferably about 1-2 kHz, so that a narrow receiver bandwidth can be used to efficiently process the calibration signal.

A DF system is typically calibrated at many different frequencies across a wide band of interest. The spacing between frequencies is chosen based on how much error can be tolerated by processing a signal that happens to fall between two calibration frequencies. For each frequency that is calibrated, there will be five tones as described above centered on the calibration frequency. The five tones at each calibration frequency are received and processed as a group, which allows the effect of varying polarization to be taken into account with each calibration measurement.

Figure 4:
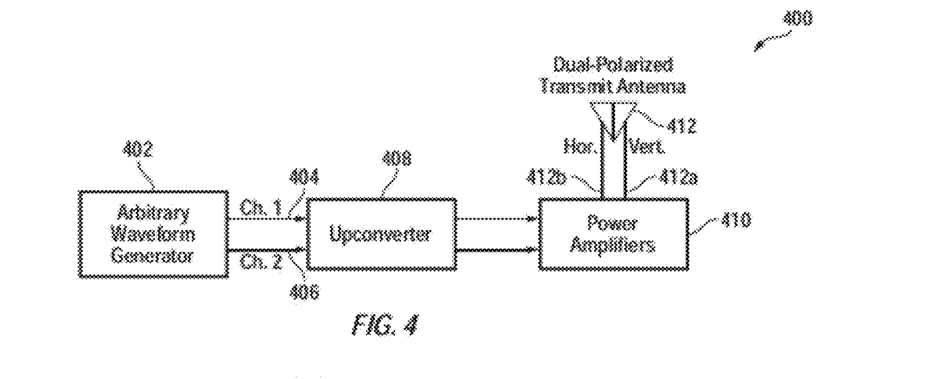
FIG. 4 is a schematic block diagram illustrating an apparatus for generating a calibration signal used to create a calibration table for a near vertical direction finding system in accordance with one embodiment of the present invention.

FIG. 4 is a schematic block diagram illustrating an apparatus 400 for generating a calibration signal for the NVDF system. The calibration signal is created most efficiently by using a device called an arbitrary waveform generator (AWG) 402. An AWG is basically a device with a large amount of memory for digitally storing the values of a desired signal and a digital to analog converter (DAC) that converts those digital values into a voltage that varies with time as the waveform values are played back at a specified rate. In order to create a series of tones with different polarizations, it is necessary to use a dual-channel AWG that is capable of playing back two independent channels 404, 406 simultaneously and coherently. These two channels define the voltages as a function of time that is applied to a dual-polarized antenna 412, i.e., an antenna that has both vertical (412a) and horizontal (412b) input ports. The output of the antenna 412 will be a sum of the two input channels, and the relative voltages on the two channels will create an electrical field vector with a polarization that depends on the relative values of these voltages. Referring back to FIG. 3A, the five tones are generated in channel 1 (404) and weighted as the cosine of the polarization angles and fed to the horizontal input port 412b of antenna 412. Channel 2 (406) of the AWG generates the same five tones, but with a sinusoidal weighting, and these fed into the vertical input 412a of antenna 412. These two channels will then combine in space when transmitted by the antenna and will form a signal in which each tone has the desired polarization. If the RF frequencies that are being calibrated are lower than half of the sample rate used in the AWG, then it is possible to create these frequencies directly out of the AWG. If the desired RF frequencies are higher than this, then the calibration tones must be created at a lower frequency (usually called the "intermediate frequency" or "IF") and are then upconverted in upconverter 408 to the final RF frequency using a mixer and a local oscillator. The two channels 404, 406 will usually be amplified by an RF power amplifier 410 before being applied to the antenna 412 in order to ensure that the signal is sufficiently strong to be well above the noise level when they arrive at the airborne receiver. The AWG is capable of creating a large number of calibration frequencies across a desired frequency band, each of which has the five tones that have been described.

As a practical matter, it is necessary that the channel 1 (404) and channel 2 (406) signals arrive at the antenna inputs (412*a*, 412*b*) with no phase shift relative to each other. This is required so that the combination of the two channels produces the desired linear polarization at the various angles. If the two channels are not phase aligned, then the result will be somewhere between linear and circular polarization, most likely elliptically polarized. Since circularly polarized receive antennas are commonly used in the receive array, it undesirable to have circular or elliptical polarization in the calibration signal because it may contain a strong component of circular polarization that is opposite in sense to the receiver antennas, which would produce a low output. A simple method to ensure that the two channels are properly phase aligned is to create the five tones such that one of them has a polarization angle of 135 degrees. This will produce a tone in the two channels that is equal in amplitude but opposite in polarity. If the outputs of the two channels are removed from the antenna and fed to a 0 degree RF summer (often called a splitter since it can also be used to split one signal into two outputs) then the tone at 135 degrees will cancel out (i.e., it will produce a null as viewed on a spectrum analyzer) if the two channels are in phase. The AWG waveform can be created with various degrees of phase offset between the two channels, and the best offset that produces the two outputs that are phase aligned can be found by selecting the waveform with the lowest null.

Once the calibration signal has been set up and properly aligned, the transmit antenna is set up in area where the airborne platform can fly above it. If only one calibration site is used, the calibration transmit antenna must be pointed straight up, so that it transmits up and in a cone with a beamwidth that is wide enough to cover the desired angular FOV over which the system will be used. The airborne platform then flies over the calibration site, collecting the calibration signal a large number of different angles within the two dimensional FOV. This generally requires that the airborne platform fly over the calibration site in a raster type of pattern. It is also possible to use more than one calibration site, in order to reduce the time required to perform the calibration. If multiple sites are used, the antennas of some sites may be angled from a vertical orientation to increase the amount of calibration signal power received at the airborne platform. The calibration data from each angle is calculated and put into a two-dimension calibration table that is used later during operation to determine the direction of unknown RF emitters. At each instance during the flight where the airborne platform collects calibration data, the signal for a short duration called the "integration time" (typically between 20 ms and 100 ms in duration) is collected from each of the N channels. From this set of data, an N×N correlation matrix is created in the standard way. From the correlation matrix, the eigenvalues and eigenvectors are then extracted using standard mathematical routines that are widely available. The dominant eigenvector is the one with the largest eigenvalue and is termed the dominant eigenvector, which will here be denoted as $e_1$. The eigenvector with the second largest eigenvalue is denoted as $e_2$. Each of these eigenvectors is a column vector with N complex elements that represent the amplitude and phase of the calibration signal as it was received. The other N-2 eigenvectors are not used. A compensation signal must be used during the calibration process (as previously described), in order to remove phase shifts caused by cables and the receivers that vary with time and temperature. The compensation vector is then divided into the two eigenvectors, element by element, to remove the phase and amplitude shifts. This produces a set of eigenvectors that can be used a later time to characterize the response of the array. The compensation vector is formed from processing the compensation signal that is locally injected into the system, as was described in paragraph 0023. The compensation signal is received by the N channels and then is downconverted to 0 Hz and lowpass filtered to separate it from the signal of interest. The lowpass filter has very low bandwidth, which can be two to ten times the reciprocal of the integration time used for making the DF measurement. The output samples from this filtering operation are then summed for the duration of the integration time to obtain one complex value from each of the N channels. These values represent the gain and phase variations of the compensation signal as it was passed through the system. These N values are formed into an N×1 vector, which is called the compensation vector.

The two compensated eigenvectors can be used to model the response of the antenna array to any arbitrary polarization since they were extracted from a calibration signal that has a variety of polarizations spanning the entire range from 0 to 180 degrees. These two eigenvectors can be thought of as defining a two-dimensional plane within the larger N dimensional space of the array response. A signal with arbitrary polarization received at the same angle as the calibration signal for any particular calibration table bin will fall somewhere within the plane defined by the two eigenvectors stored in that bin of the calibration table. When the calibration table is used in operation, it is only necessary to extract the dominant eigenvector from the signal and project it into the plane of the two eigenvectors at each bin of the calibration table. The projection which has the largest magnitude constitutes the best match, and that bin represents the angle of the unknown signal.

It is very time-consuming to collect all of the data in the calibration signal across the entire FOV, but fortunately it is not necessary to collect data at each and every bin (i.e., at every possible angle). Small gaps in the calibration table can be filled in by mathematically interpolating over the collected data set. The number of bins contained in the calibration table depends on the total desired FOV of the system, and on the resolution that is selected for the calibration table. A finer resolution will result in higher accuracy (assuming the array and system design supports this accuracy), and high accuracy system would typically use about ½ degree as the bin spacing. For a typical FOV of ±60 degrees in each angular direction, this results in a calibration table size that is 241×241 bins.

Each bin in the calibration table corresponds to a particular bearing vector, which defines the two angles necessary to reconstruct the direction of arrival for an incoming signal. It is possible to construct different forms of representing the two-dimensional bearing vector, with azimuth and elevation being one possibility. However, the azimuth angle becomes undefined for angles directly below the airborne platform where the elevation is 0 degrees and hence it is not a good choice of angular coordinates. A more suitable choice is to define the bearing vector as two rotations of a standard vector that initially points directly down towards the nadir. If we start with this nadir vector and then apply a rotation about the y axis (defined as the axis through the wings of the airborne platform) followed by a rotation about the x axis (defined as the axis from nose to tail of the airborne platform) then we have a way to describe all directions of arrival from nadir out to the horizon with no ambiguity or singularities. This is only one possible method to describe the bearing vector, and many other methods could be used as long as they uniquely describe the direction of arrival of the signal in two dimensions.

During operation, an unknown received signal is received at a given frequency and the signal is collected across all N channels from the array and stored in a digital format for processing. Depending on the sample rate used to digitize the data and time duration over which the measurement is made, there will be a time series of M samples for each of the N input channels. The data that is collected can be put into an M×N matrix, with each column representing the data versus time for one of the channels. If this matrix is called "A" then the correlation matrix (R) can be formed in the usual way by forming the product $A^H A$, where the H denotes the Hermetian operator (i.e., taking the complex conjugate of the matrix A). The dominant eigenvector is then extracted from the correlation matrix R. The compensation is vector is then divided into the eigenvector element by element as was done when collecting the calibration data. Only the dominant eigenvector is needed for the lookup process because only one vector is needed that indicates the phase and amplitude of the signal across the array. The resultant eigenvector that has been compensated is called a "direction vector" and will be denoted by the symbol DV. As was briefly described earlier, the process of determining the angle of arrival requires finding the best match of the DV to each bin in the calibration table. This can be done by calculating a correlation value (r) as follows: $r = abs(DV^H e_1)^2 + abs(DV^H e_2)^2$. The calibration table bin that has the highest value of r is the best match to the direction vector DV. The two angles associated with this bin then constitute the angle of arrival of the signal, and this was previously described as the "bearing vector". The two angles that constitute the bearing vector can be stored at each bin in the calibration table, or they can be calculated based on the bin location where the best match occurred.

The bearing vector that is obtained from the calibration table search must then be transformed from the reference frame of the sensor array to a locally level reference frame relative to a standard heading direction such as True North. The navigation data in the form of the heading, pitch, and roll are used to correct for the orientation of the sensor frame to obtain a bearing vector that is specified in a locally level reference frame relative to True North. This bearing vector can then be intersected with the Earth's terrain to obtain the geolocation of the RF emitter. This geolocation is usually in the form of a latitude and longitude, but other forms of mapping references can be used. This information can then be sent to the user and it can be displayed on a map.

Figure 5:
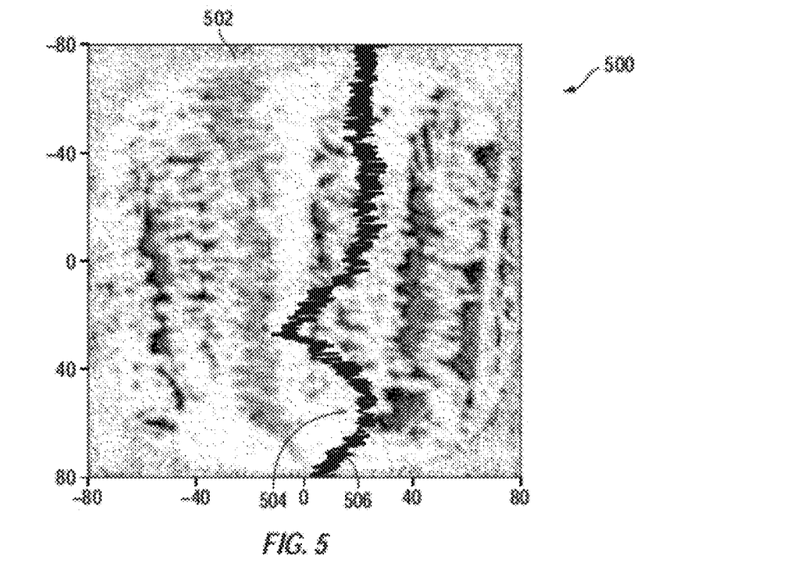
FIG. 5 is an illustration of a pilot's display of a calibration table as it is being constructed.

The calibration procedure may be further refined as follows. FIG. 5 is an illustration of a display 500, plotted in degrees, of the entries in the calibration table derived as the readings are collected on board the airborne platform. Since it is impossible, without an infinite number of readings, to completely fill in the space covered by the graph, there will inevitably emerge gaps, such as at 502 and 504, that will need to be filled in as the data is being collected. By displaying graph 500 to the pilot of the aircraft during calibration, the pilot can steer the aircraft in real-time and tilt the antenna array that is making the readings appropriately to fill in the most glaring gaps. The track of the path of the readings through the table as the aircraft makes a pass to fill in the gap 504 is shown at 506. Graph 500 can be displayed on a lap top computer or small display screen in the cockpit, for example, to thereby provide an image of the 2-dimensional calibration table. The current path, 506 in FIG. 5, is highlighted as it is being flown; after that, it is de-highlighted and blended into the graph, and a new highlighted track is begun with the next pass over the calibration site. The pilot can steer the aircraft towards empty areas and bank the plane left or right to hit smaller gaps in the calibration table, which greatly reduces the time required to fill in the calibration table.

Figure 6:
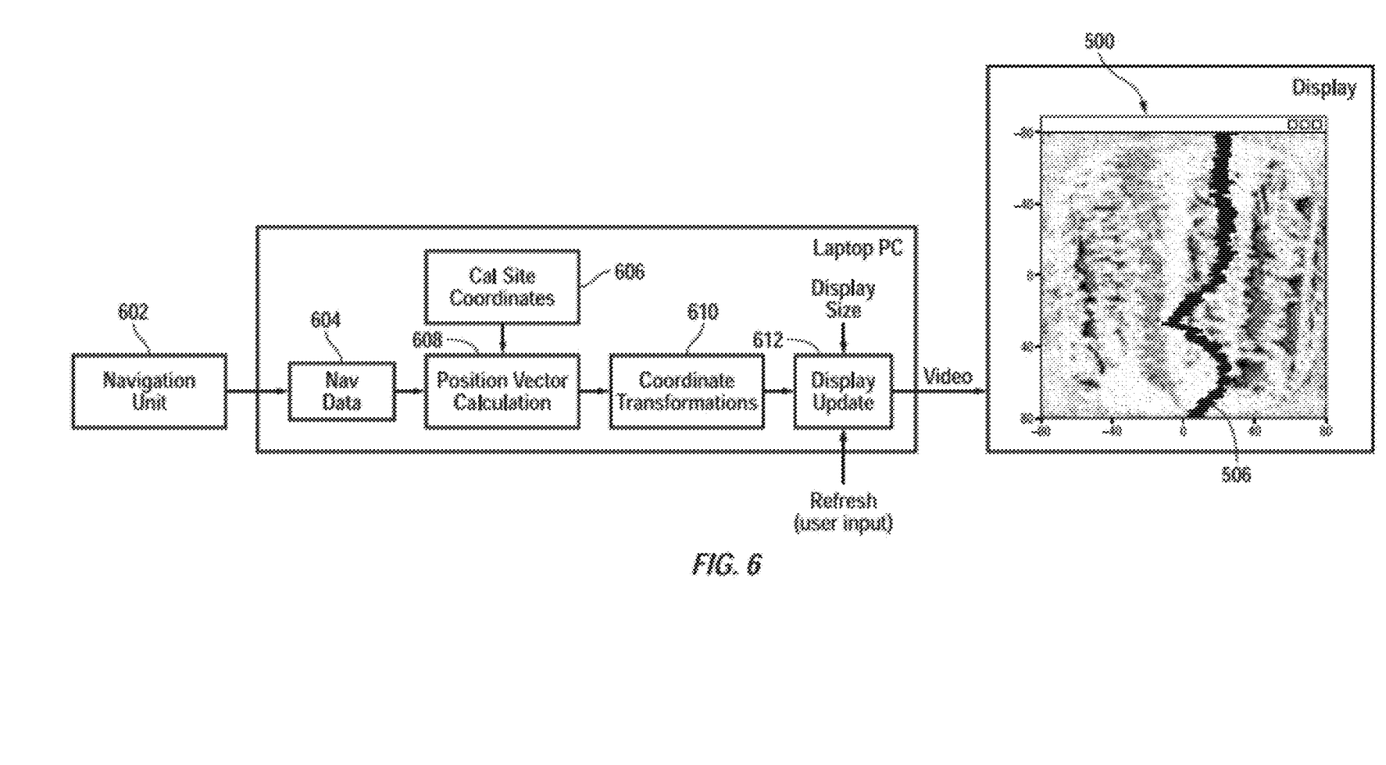
FIG. 6 is a flow diagram illustrating a process used to create a calibration table in accordance with one embodiment of the present invention.

FIG. 6 is a flow diagram illustrating the calibration process flow in accordance with one embodiment of the present invention. At 602, a navigation unit is shown installed in the aircraft and provides real-time data, at 604, on the position (latitude, longitude, altitude) of the aircraft, as well as the heading, pitch, and roll. The update rate of the navigation data is typically ten times per second (10 Hz), but may vary depending on the particular type of navigation unit that is used. The calibration site coordinates (latitude, longitude, altitude) are entered at 606 in order to calculate the angle from the calibration site antenna (transmitter) to the receive antennas on the aircraft. The angular size of the calibration table being generated is also an input parameter, and is typically 65 to 80 degrees, depending on the system field-of-view desired. At 608, a position vector calculation is made, generating a vector from the calibration site to the current aircraft position. Coordinate transformations, at 610, use the heading, pitch, and roll information from the navigation data to convert the position vector to a bearing vector that is relative to the array on the airplane at its current attitude relative to a locally level tangent plane to the Earth. A display update takes the bearing vector and converts it to the two angles used in the calibration display of FIG. 6 and then, at 612, updates the colors of the bins. A user input "Refresh" is used to allow the user to turn the color of the most recent pass over the calibration site from highlighted to de-highlighted after the pass has completed. This refresh action can also be programmed to occur automatically by turning the current track to de-highlight after the airplane has passed a certain distance past the end of the track.

While embodiments and applications have been shown and described, it would be apparent to those skilled in the art having the benefit of this disclosure that many more modifications than mentioned above are possible without departing from the inventive concepts disclosed herein. The invention, therefore, is not to be restricted except in the spirit of the appended claims.

What is claimed is:

1. A method for geolocating an RF emitter disposed on or near the ground, the method comprising:
   receiving a signal from the RF emitter at each antenna of an array of N non-collinear antennas, wherein N is an integer greater than 2;
   routing the signal received at each of the antennas to one of a bank of N corresponding receivers;
   downconverting the N received signals to N downconverted signals;
   digitizing the N downconverted signals to digitized signals on N corresponding channels; and
   using a processor coupled to a navigation unit:

to determine phase and amplitude variations across the N channels and to determine a Direction Vector corresponding to the signal received from the RF emitter;

to use a 2-dimensional pre-determined calibration table to look up a best match to the Direction Vector to determine a Bearing Vector to the RF emitter;

to transform the Bearing Vector into locally level reference frame; and to geolocate the RF emitter by determining an intersection between the locally level reference frame Bearing Vector and a dataset containing local terrain data.

2. The method of claim 1, further comprising: displaying the geolocated RF emitter on a visually perceivable display.

3. The method of claim 1, further comprising: transmitting coordinates of the geolocated RF emitter to another device.

4. The method of claim 1, wherein the antennas are circularly polarized antennas.

5. The method of claim 4, wherein the antennas are patch antennas.

6. The method of claim 4, wherein the antennas are cavity-back spiral antennas.

7. The method of claim 4, wherein the antennas are helical antennas.

8. The method of claim 4, wherein the antennas include a 90 degree hybrid combiner.

9. The method of claim 1, further comprising:

compensating for phase and amplitude drift with a compensation unit having a signal generator configured to generate a reference signal of any frequency on which the RF emitter is emitting, and an RF coupler configured to inject the reference signal from the compensation unit into the signal path between the antenna array and the receivers.

10. A system for geolocating an RF emitter disposed on or near the ground, the system comprising:

an array of N non-collinear antennas each configured to receive a signal from the RF emitter, wherein N is an integer greater than 2;

a bank of N corresponding receivers each configured to receive a corresponding signal from one of the antennas of the array, the receivers configured to downconvert the N received signals to N downconverted signals and to digitize the N downconverted signals to digitized signals on N corresponding channels;

a processor configured:
to determine phase and amplitude variations across the N channels and to determine a Direction Vector corresponding to the signal received from the RF emitter;

to use a 2-dimensional pre-determined calibration table to look up a best match to the Direction Vector to determine a Bearing Vector to the RF emitter;

to transform the Bearing Vector into a locally level reference frame; and to geolocate the RF emitter by determining an intersection between the locally level reference frame Bearing Vector and a dataset containing local terrain data.

11. The system of claim 10, further comprising: a visual display configured to display the geolocated RF emitter.

12. The system of claim 10, further comprising: a datalink configured to transmit coordinates of the geolocated RF emitter to another device.

13. The system of claim 10, wherein the antennas are circularly polarized antennas.

14. The system of claim 13, wherein the antennas are patch antennas.

15. The system of claim 13, wherein the antennas are cavity-back spiral antennas.

16. The system of claim 13, wherein the antennas are helical antennas.

17. The system of claim 13, wherein the antennas include a 90 degree hybrid combiner.

18. The system of claim 10, further comprising:

a compensation unit having a signal generator configured to generate a reference signal for any frequency on which the RF emitter is emitting; and an RF coupler configured to inject the reference signal from the compensation unit into the signal path between the antenna array and the receivers.

* * * * *